3,475,796
SAFETY PIN
Marie Petti, 89—53 240th St.,
Bellerose, N.Y. 11426
Filed May 24, 1968, Ser. No. 731,984
Int. Cl. A44b 9/12
U.S. Cl. 24—156                    5 Claims

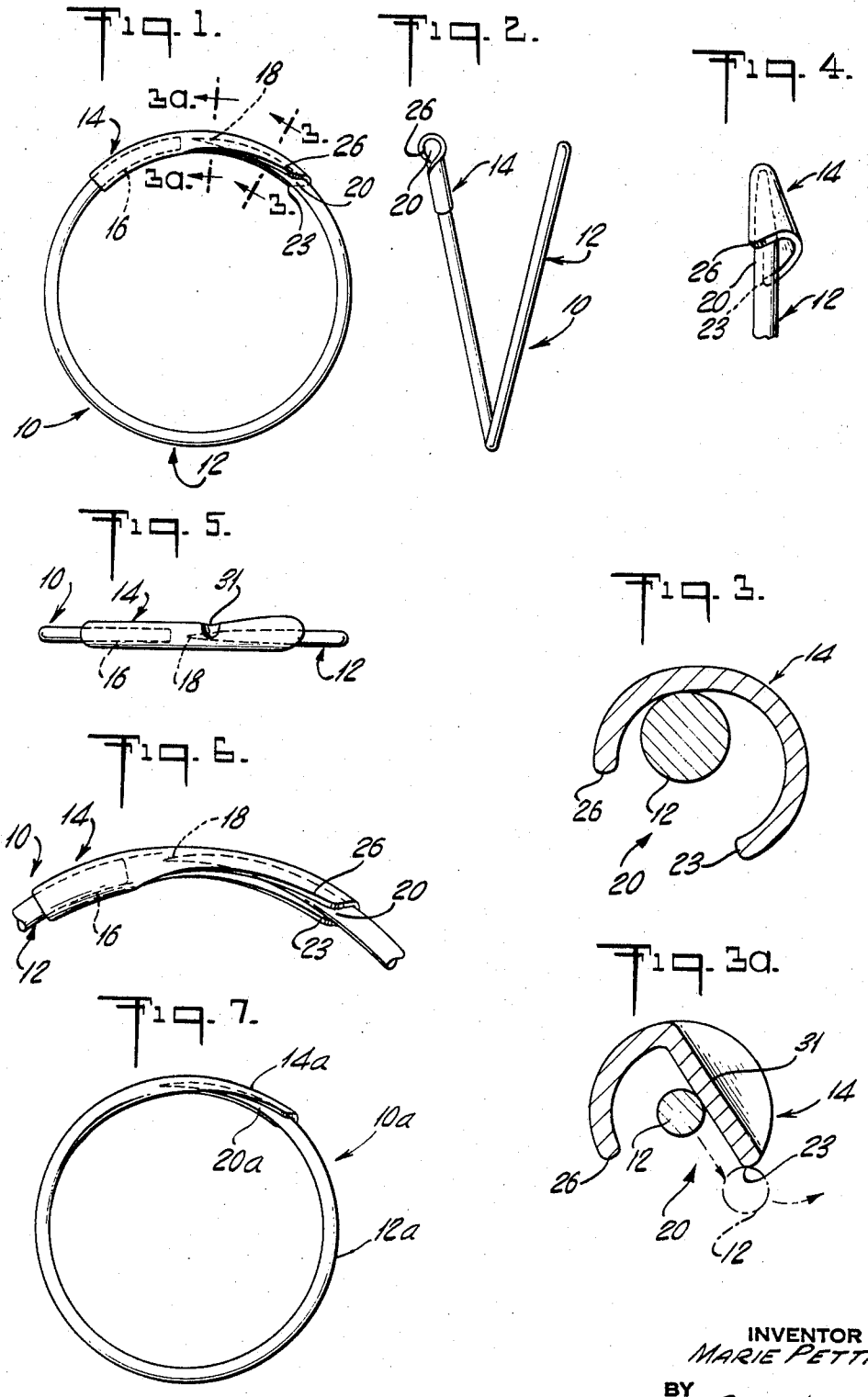

ABSTRACT OF THE DISCLOSURE

A safety pin having a resilient shank with one end pointed and a guard at the other end, in which the pointed end of the shank is releasably retained in a slot in the guard whereby the thusly closed pin defines a closed figure lying in a plane and the shank has imparted thereto a permanent set so that the pointed end moves to a position outside the plane when it is released from the slot to open the pin.

---

The present invention relates to improvements in safety pins, and more particularly, to a novel safety pin which has a resilient shank and a guard which receives the pointed end of the shank. In accordance with the invention, the shank is given a "set" which, in effect, acts as a positive latch in preventing opening of the pin unless the shank is deliberately released from the guard. The "set" is such that the pin of this invention, in the open condition, does not exceed its closed overall dimension or when the pin is made in the preferred circular form, diameter. In addition, the pin of this invention is preferably made in one piece. A unitary two part structure is also disclosed.

The guard referred to in the foregoing may also be designated a "lock." This lock is to measure, in the preferred form, one-quarter of the circumference of the pin, and it is formed in a novel manner as a safety lock which will not allow the pin to open by lateral pulling out. The pin of this invention will open and close only by a springing action.

The primary object of this invention is to provide a novel fastening means in the form of a safety pin which will remain in its closed fastening position until it is opened, the object being attained without the use of separate latching devices.

Another object of the invention is to provide a safety pin having a novel guard or lock.

A further object of the invention is to provide a safety pin which does not change its overall dimension or diameter in the open position.

A still further object of this invention is to provide a circular safety pin in which the lock is of novel construction and is substantially one-quarter of the length of the circumference of the pin disclosed herein.

Other objects of the invention will become apparent from a reading of the following specification in connection with the accompanying drawings in which:

FIG. 1 is a view in elevation of a two-piece pin of this invention in the closed or locked position;

FIG. 2 is a view in edge elevation of the pin of FIG. 1 in the open position;

FIG. 3 is a sectional view on lines 3—3 of FIG. 1;

FIG. 3a is a sectional view on line 3a—3a of FIG. 1;

FIG. 4 is a view on a greatly enlarged scale of the pin of FIG. 1 fragmentarily showing the pin in closed position;

FIG. 5 is a top plan or edge view of the pin of FIG. 1;

FIG. 6 is a fragment of FIG. 1 drawn to a more enlarged scale; and

FIG. 7 is a view similar to FIG. 1 showing another embodiment.

Referring to the drawings, and for the present to FIGS. 1 to 5, reference character 10 indicates one embodiment of the pin of this invention comprising a shank 12 and a guard or lock 14. (FIGS. 1, 2 and 5 are approximately double size). The lock 14 may extend as shown for approximately one-quarter of the circumference of the entire pin 10 when the pin is of circular shape. One end 16 of the shank 12 is permanently fixed in the guard 14 and the other end of the shank 12 tapers to a point 18 and is disengageably engaged by the guard 14. The slender construction of the shank causes the shank to be resilient to the proper degree axially of the substantially circular pin. The shank is also resilient to some extent in radial directions. It will be understood that the shank and consequently the finished pin may alternatively be in the form of a half circle, a triangle, an oval, a square, a rectangle, etc. Whatever the form, the shank will have imparted thereto the herein described set.

The shank is given an initial distortion or set as shown in FIG. 2 of the drawing. As viewed in FIG. 1, the shank is biased axially away from the slot 20 in the guard. FIG. 2 indicates the approximate degree of initial set found to be suitable in practice. The shank may be made of a suitable material, such as stainless steel. Due to the resiliency of the material of the shank, the set is permanent.

In the embodiment of FIG. 1, the guard 14 is formed of sheet metal. One end portion of the sheet is crimped to encircle the end of the shank. One edge 23 of the sheet comprising the guard continues toward the free end of the guard inside of the pin. The other edge 26 flares outwardly thus providing the slot 20. The slot 20, therefore, opens laterally but its opening is inclined inwardly to define an acute angle, preferably about forty-five degrees, with the plane in which the pin lies when the pin is closed.

The interior surface 28 of the guard 14 has an angular slope as shown most clearly in FIG. 3. A portion of the surface 28 coextensive with at least part of the portion of the length of the shank 12 which is engaged by the guard 14 is shaped to define a projection or bump. The projection 31 is located preferably at the portion of the surface 28 abutting the tapered portion of the shank 12 (FIG. 3a). To move the pin from a closed position to an open position, the shank 12 is urged laterally to the right, referring to FIGS. 3 and 3a. The shank 12 is thereby moved downwardly along the projection 31, passes over the edge 23 of the guard and springs to the open position (FIG. 2). Conversely, to close the pin, the shank 12 is urged to the left, referring to FIG. 2. The shank 12 is thereby moved downwardly along the exterior surface 32 of the guard 14, passes over the edge 23 and springs to the open position (FIG. 2).

FIG. 7 illustrates another embodiment of the pin of this invention. This other embodiment, pin 10a, differs from the above embodiment only in that the shank, designated 12a, and the guard, designated 14a, are here fabricated from a single piece of metal. To fabricate the pin 10a, a rod of metal is tapered to a point at one end and at the other end is axially pierced, expanded and slotted to form the guard 14a. The thus partly fabricated pin is completed by being bent into the desired configuration, preferably circular, and the desired permanent set is imparted to the shank.

While the invention has been described with reference to fabrication from metals, of which steel would probably be the one most commonly selected, it is to be appreciated that any resilient material may be employed for the shank and any material whatever of sufficient mechanical strength may be employed for the guard. Thus plastics may be readily employed for the guard and may even be employed for the shank or a combination of materials may be employed, for example, a plastic for the guard and steel for the shank. Moreover, it is to be understood that the invention as defined by the appended claims is not limited in any respect to the herein described specific embodiments but is intended to encompass all embodiments within the spirit of this disclosure.

What is claimed is:
1. A safety pin comprising a shank tapering to a point at one end and a guard at the end of the shank opposite said point, said guard being provided with a slot adapted to releasably retain the tapered end of the shank to hold the pin in a closed condition, the pin in a closed condition defining a closed figure lying in a plane, said slot opening toward one side of said plane, said shank being constituted of a resilient material and having a set such that when said tapered end is disengaged from said guard said tapered end is displaced away from said plane to the side of said plane opposite the side toward which said slot opens.
2. A safety pin according to claim 1, in which said closed figure is essentially a circle.
3. A safety pin according to claim 1, in which said slot lies in a plane which in a direction taken from the base of the slot towards its opening defines on acute angle with the plane of said figure.
4. A safety pin according to claim 3, in which a portion of the interior of said slot is provided with a projection which defines a camming surface for guiding the tapered end of the shank out of its locked position in the slot when pressure is applied against the shank in the vicinity of said tapered end and in the direction of said set.
5. A safety pin according to claim 4, in which the exterior of said guard on the side of said plane of the circle opposite the opening of said slot defines a camming surface for guiding the tapered end of the shank into its locked position in the slot when pressure is applied against the shank in the vicinity of said tapered end and in the direction opposite said set.

References Cited

UNITED STATES PATENTS

| | | | |
|---|---|---|---|
| 342,182 | 5/1886 | Chew | 24—156 X |
| 785,857 | 3/1905 | Cassity | 24—150.5 |
| 2,860,397 | 11/1958 | Green. | |

BERNARD A. GELAK, Primary Examiner

U.S. Cl. X.R.

24—161